(12) United States Patent
Rangi et al.

(10) Patent No.: US 11,370,369 B1
(45) Date of Patent: Jun. 28, 2022

(54) HEADER TERMINAL ALIGNMENT ASSEMBLY

(71) Applicant: Lear Corporation, Southfield, MI (US)

(72) Inventors: Bhupinder Rangi, Novi, MI (US); David Menzies, Linden, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/136,795

(22) Filed: Dec. 29, 2020

(51) Int. Cl.
*B60R 16/02* (2006.01)
*B60L 53/80* (2019.01)
*H01M 10/42* (2006.01)

(52) U.S. Cl.
CPC .......... *B60R 16/0215* (2013.01); *B60L 53/80* (2019.02); *H01M 10/425* (2013.01)

(58) Field of Classification Search
None
See application file for complete search history.

(56) References Cited

U.S. PATENT DOCUMENTS

| | | | | |
|---|---|---|---|---|
| 4,888,453 A * | 12/1989 | Blasko | H02G 3/0691 174/72 A |
| 5,820,413 A * | 10/1998 | Yamada | H01H 85/545 439/620.26 |
| 5,971,801 A * | 10/1999 | Kato | B60L 3/0069 439/157 |
| 6,002,088 A * | 12/1999 | Ehmann | H02G 15/013 174/152 G |
| 6,050,839 A * | 4/2000 | Seminara | H01R 13/5202 174/72 A |
| 6,261,123 B1 * | 7/2001 | Kruger | H01R 13/60 439/484 |
| 6,773,307 B2 * | 8/2004 | Beer | H01H 9/085 439/620.26 |
| 7,244,148 B2 * | 7/2007 | Maguire | B60L 3/04 439/620.28 |
| 7,914,344 B2 * | 3/2011 | Tin | H01R 24/50 439/675 |
| 8,100,715 B2 * | 1/2012 | Whitlock | H01R 24/38 439/580 |
| 8,162,672 B2 * | 4/2012 | Huang | H01R 13/11 439/63 |
| 8,192,212 B2 * | 6/2012 | Casses | B60L 53/16 439/181 |
| 8,562,368 B2 * | 10/2013 | Boyer | H01H 1/2058 439/345 |
| 9,231,359 B1 * | 1/2016 | Butcher | H01R 33/95 |

(Continued)

FOREIGN PATENT DOCUMENTS

| | | | | |
|---|---|---|---|---|
| CN | 101647137 A | * | 2/2010 | ............ B60L 50/51 |
| CN | 109712763 A | * | 5/2019 | ........... H05K 7/1432 |

(Continued)

*Primary Examiner* — Timothy J. Dole
*Assistant Examiner* — Muhammed Azam
(74) *Attorney, Agent, or Firm* — MacMillan, Sobanski & Todd, LLC

(57) ABSTRACT

A terminal holder includes a holder body. Two terminal mounts extend through the holder body. Each terminal mount includes a terminal shroud that defines a terminal space around a terminal axis. A lock flange extends from the terminal shroud toward the terminal axis. A lock finger also extends from the terminal shroud toward the terminal axis. The lock flange and the lock finger are spaced apart to define a terminal lock space therebetween.

12 Claims, 13 Drawing Sheets

(56) References Cited

U.S. PATENT DOCUMENTS

| | | | |
|---|---|---|---|
| 9,397,459 B2 * | 7/2016 | Butcher | H01H 85/54 |
| 9,824,837 B2 * | 11/2017 | Ooishi | H01H 9/26 |
| 9,966,713 B1 * | 5/2018 | Shaeffer | H01R 24/86 |
| 9,979,141 B2 * | 5/2018 | Yasuda | H01R 13/665 |
| 10,910,800 B1 * | 2/2021 | Baseri | H01M 50/517 |
| 10,950,970 B2 * | 3/2021 | Paynter | H01R 24/40 |
| 2006/0019541 A1 * | 1/2006 | Maguire | H01H 9/102 |
| | | | 439/620.34 |
| 2007/0037049 A1 * | 2/2007 | Iijima | H02J 7/342 |
| | | | 429/99 |
| 2007/0244471 A1 * | 10/2007 | Malackowski | H01M 10/48 |
| | | | 606/1 |
| 2009/0274948 A1 * | 11/2009 | Calderone | H01M 50/213 |
| | | | 429/50 |
| 2010/0105226 A1 * | 4/2010 | Gong | H01R 13/7031 |
| | | | 439/135 |
| 2012/0103684 A1 * | 5/2012 | Maguire | H01R 11/284 |
| | | | 174/72 A |
| 2013/0337299 A1 * | 12/2013 | Sugawara | H01M 50/572 |
| | | | 429/61 |

FOREIGN PATENT DOCUMENTS

| | | | | |
|---|---|---|---|---|
| CN | 111276763 A | * | 6/2020 | |
| DE | 202017100924 U1 | * | 3/2017 | F16L 58/00 |
| DE | 102019113579 A1 | * | 2/2020 | H02P 27/06 |
| EP | 2339661 A1 | * | 6/2011 | H01M 10/48 |
| KR | 20060045191 A | * | 5/2006 | |
| KR | 20200030487 A | * | 3/2020 | H01M 10/654 |
| WO | WO-2012078727 A2 | * | 6/2012 | B60L 50/16 |
| WO | WO-2012137289 A1 | * | 10/2012 | H01M 50/20 |
| WO | WO-2012157094 A1 | * | 11/2012 | H01M 10/425 |
| WO | WO-2013186878 A1 | * | 12/2013 | H01M 10/48 |
| WO | WO-2013188680 A1 | * | 12/2013 | H01M 10/425 |
| WO | WO-2016174447 A1 | * | 11/2016 | B60R 16/0215 |
| WO | 2019206933 A1 | | 10/2019 | |
| WO | WO-2020040028 A1 | * | 2/2020 | B60R 16/0207 |

* cited by examiner

US 11,370,369 B1

HEADER TERMINAL ALIGNMENT ASSEMBLY

BACKGROUND OF THE INVENTION

This invention relates in general to an electrical circuit interrupt. More specifically, this invention relates to a manual service disconnect for an electric battery.

A manual service disconnect is provided as a safety device on battery electric vehicles. The manual service disconnect is provided at the batteries and is a removable breaker for a high voltage circuit. When maintenance work on high voltage parts of the vehicle are being done, the manual service disconnect can be removed in order to interrupt current flow. An example of a manual service disconnect is described in U.S. Pat. No. 9,397,459.

The physical shape and size of the manual service disconnect can vary based on the available space in the vehicle and the desired position of the manual service disconnect. In order to ensure that the high voltage circuit is maintained when the manual service disconnect it closed, it is desirable to keep all components of the manual service disconnect in their desired positions during assembly and to account for any variations in component size that can occur during manufacturing. It is desirable to have an improved manual service disconnect.

SUMMARY OF THE INVENTION

The invention relates to a terminal holder. The terminal holder includes a holder body. Two terminal mounts extend through the holder body. Each terminal mount includes a terminal shroud that defines a terminal space around a terminal axis. A lock flange extends from the terminal shroud toward the terminal axis. A lock finger also extends from the terminal shroud toward the terminal axis. The lock flange and the lock finger are spaced apart to define a terminal lock space therebetween.

Another embodiment of the invention relates to a header assembly. The header assembly includes a first terminal holder that includes a first alignment lock. A first terminal is retained in a first terminal holder and is attached to a first bus bar. A second terminal is retained also in the first terminal holder and is attached to a second bus bar. The header assembly also includes a second terminal holder that includes a second alignment lock. A third terminal is retained in a second terminal holder and is attached to a third bus bar. A fourth terminal is also retained in the second terminal holder and is attached to a fourth bus bar. The first alignment lock is engaged with the second alignment lock to place the first terminal holder in a desired position relative to the second terminal holder.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
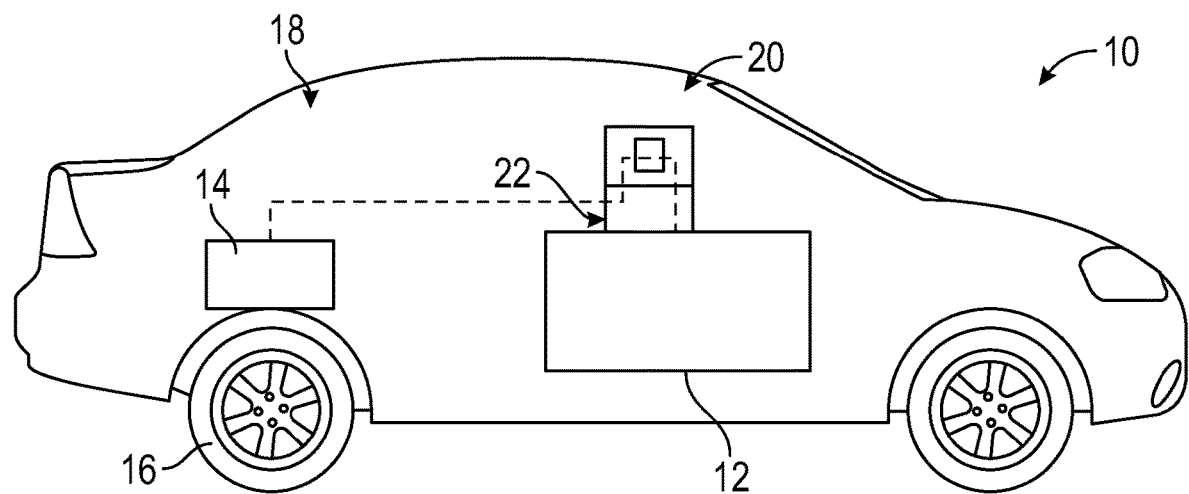
FIG. 1 is a schematic view of an electric vehicle including a high voltage battery with a manual service disconnect in accordance with the invention.

Referring now to the drawings, there is illustrated in FIG. 1 a schematic view of an electric vehicle, indicated generally at 10. The illustrated vehicle 10 may be a hybrid vehicle, or any desired type of vehicle that includes a battery 12. The battery 12 may be a single battery, or may be multiple battery cells. The electric vehicle 10 includes an electric motor 14 that is connected to drive wheels 16. A primary circuit, indicated at 18, provides current flow from the battery 12 through the electric motor 14. The illustrated electric motor 14 is one type of electric equipment that may be connected to the battery 12, and it should be appreciated that any desired electric equipment may be powered by the primary circuit 18.

The electric vehicle 10 includes a manual service disconnect, indicated generally at 20. The manual service disconnect 20 allows a technician to open the primary circuit 18 at the battery 12, for example, when the electric motor 14 is to be serviced. It should be appreciated that the primary circuit 18 is only described in a simplified form sufficient for the understanding of the manual service disconnect 20. The preferred embodiment of the invention will be described in connection with the battery 12 on the electric vehicle 10, but it should be appreciated that the invention may be used as an electric disconnect in any desired circuit.

Figure 2:
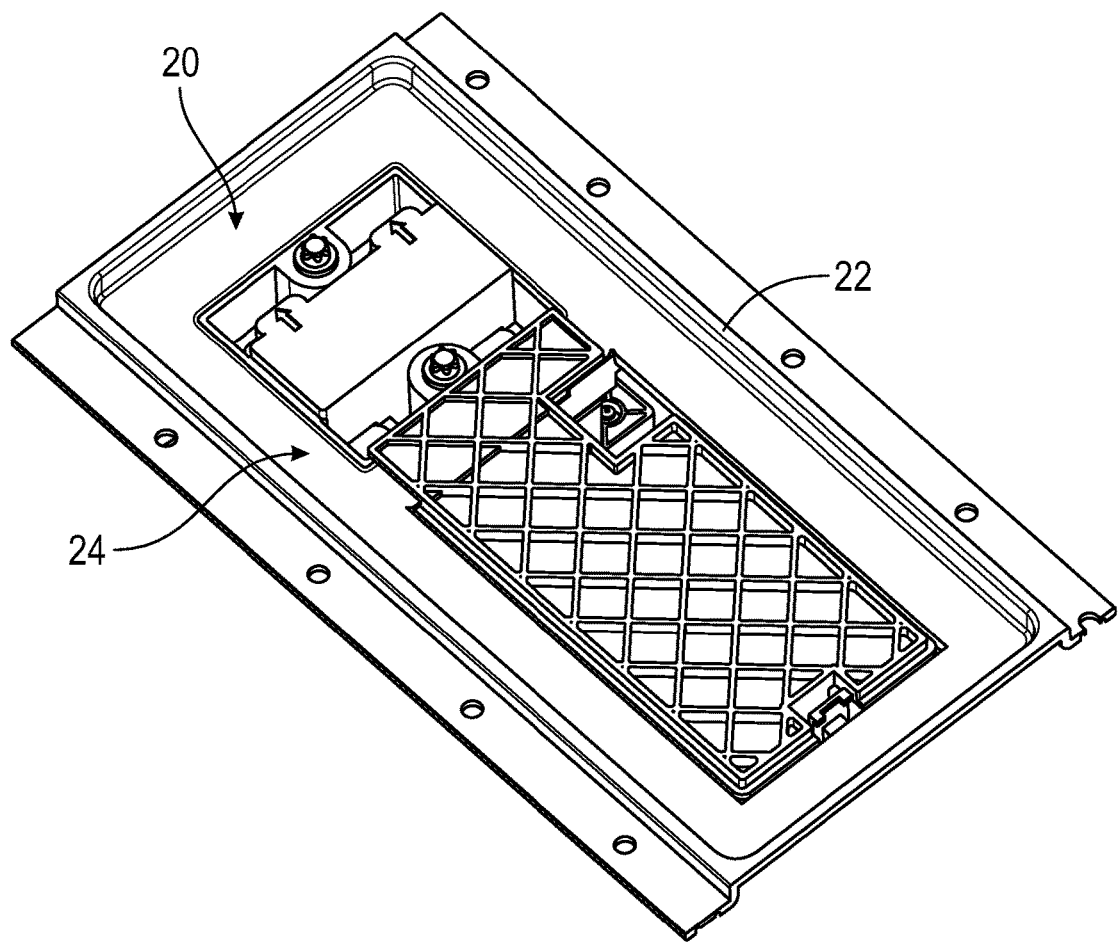
FIG. 2 is a perspective view of a portion of the battery pack with the manual service disconnect shown in a mated position.
Figure 3:
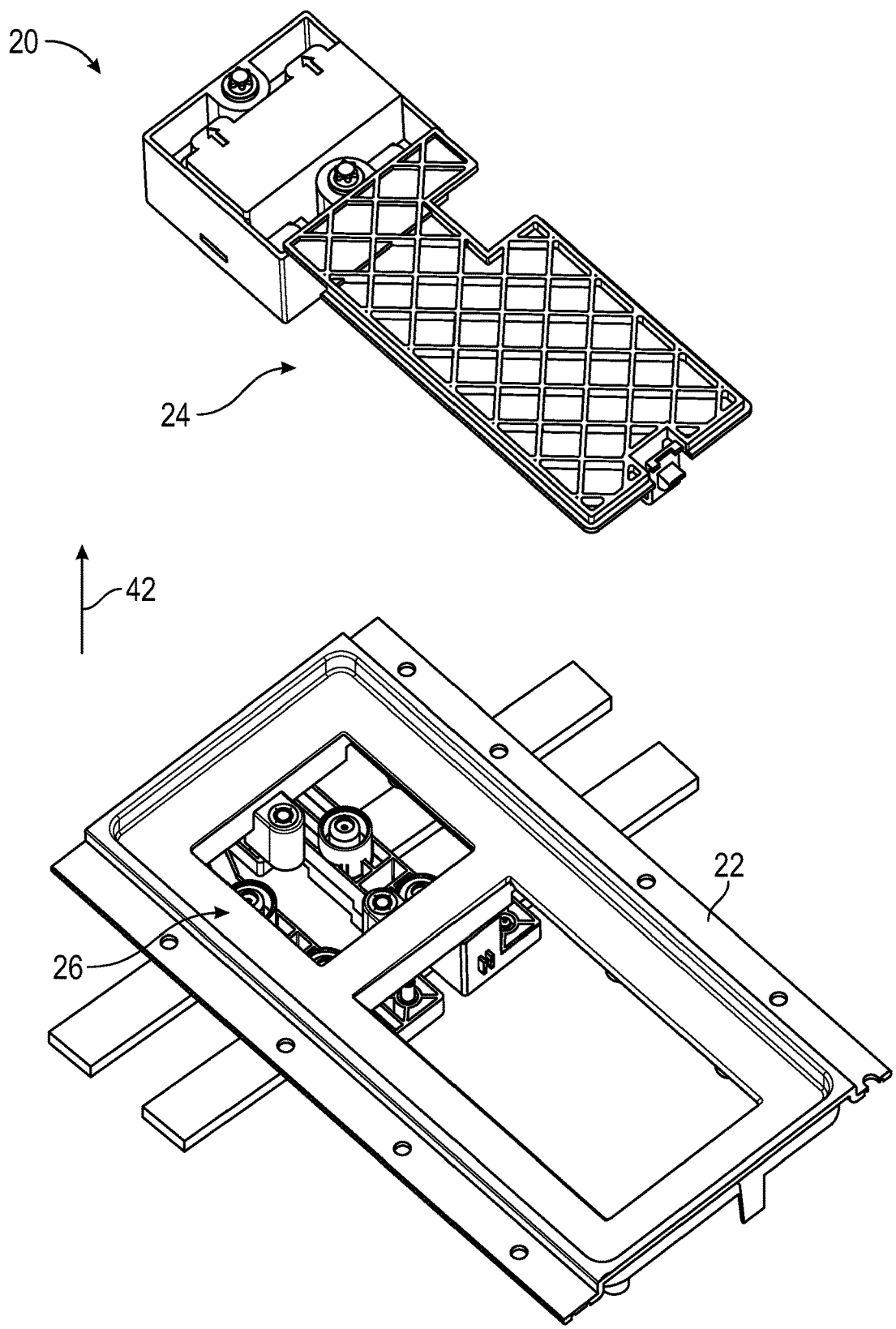
FIG. 3 is a partially exploded view of FIG. 2, with the manual service disconnect shown in an unmated position with a plug assembly removed from a header assembly, and with underlying parts of the battery pack visible.

Referring now to FIG. 2, there is illustrated a portion of an enclosure 22 for the battery 12 that includes the manual service disconnect 20. The manual service disconnect 20 includes a plug assembly 24 that is shown in a mated position in FIG. 2. Referring to FIG. 3, there is a view similar to FIG. 2, with the plug assembly 24 shown removed from the mated position, where the plug assembly 24 is separated from a header assembly, indicated at 26. When the plug assembly 24 is in the mated position shown in FIG. 2, the primary circuit 18 is closed. When the plug assembly 24 is not in the mate position, the primary circuit 18 is open.

Figure 4:
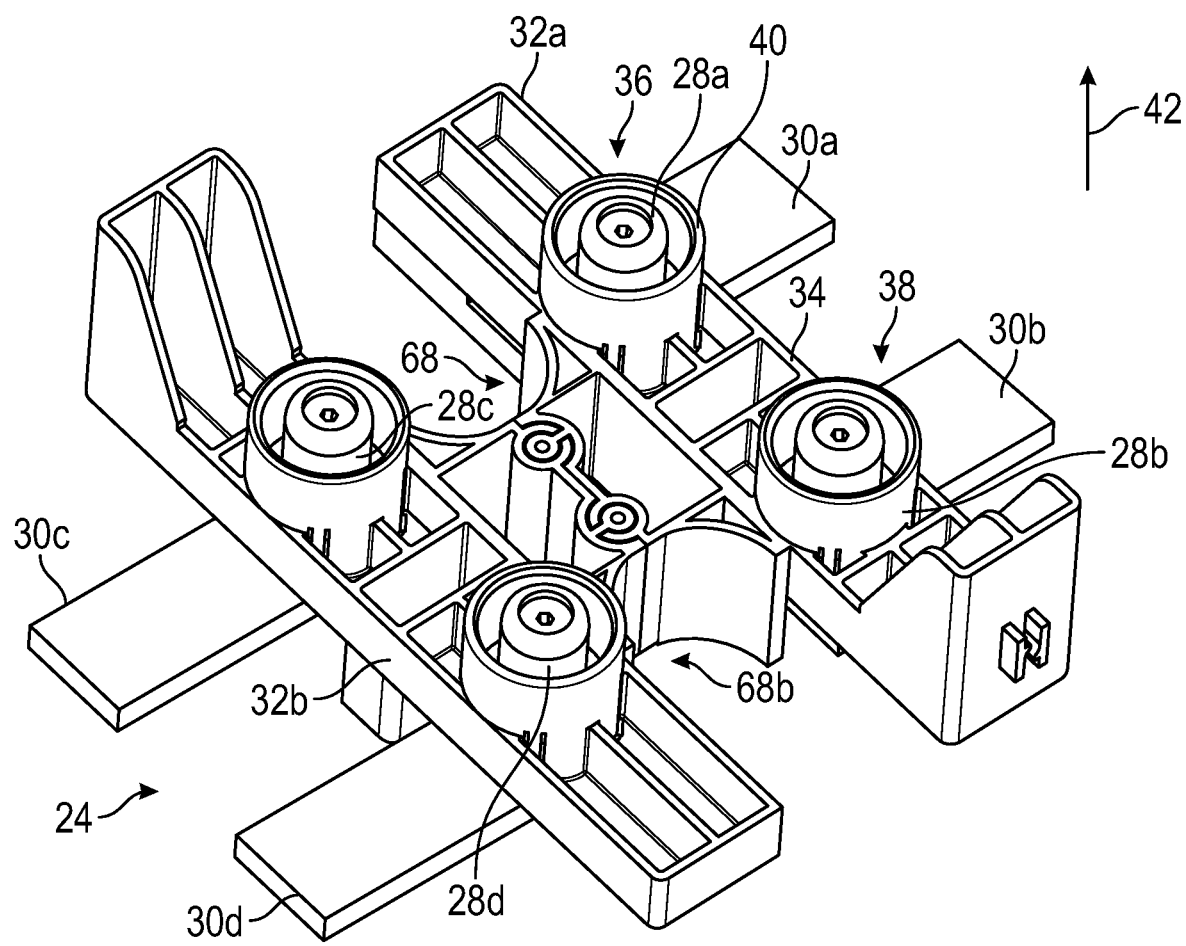
FIG. 4 is an enlarged, detailed view of a portion of the header assembly of the manual service disconnect.

Referring to FIG. 4, an enlarged view of the header assembly 26 is illustrated. The header assembly 26 includes four header terminals 28a, 28b, 28c, and 28d. Each of the header terminals 28a, 28b, 28c, and 28d is connected to a respective header bus bar 30a, 30b, 30c, and 30d. The header terminals 28a, 28b, 28c, and 28d are connected to the battery 12 and the primary circuit 18.

Figure 5:
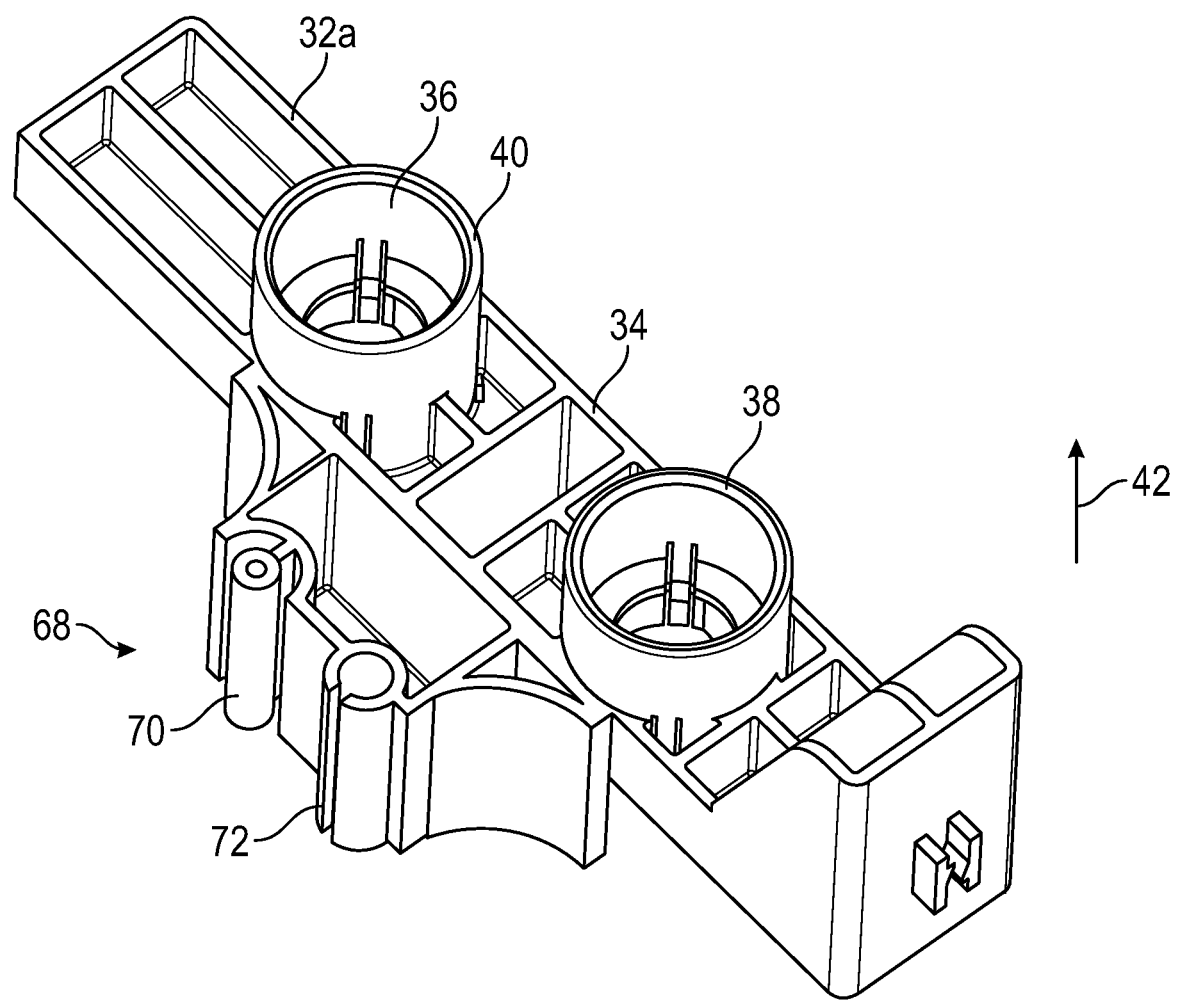
FIG. 5 is a perspective view of a terminal holder from the header assembly from FIG. 4.

The header assembly 26 includes two terminal holders 32a and 32b. The two illustrated terminal holders 32a and 32b are the same, and terminal holder 32a is illustrated in FIG. 5. The terminal holder 32a is molded from non-conductive plastic, but may be made of any desired material and may be made by any desired process. The terminal holder 32a includes a holder body 34. Two terminal mounts, indicated at 36 and 38, are located on the holder body 34. The terminal mounts 36 and 38 include similar features and only one will be described in detail. The terminal mount 36 includes a terminal shroud 40 that extends from the holder body 34 in a mate direction 42. The terminal shroud 40 is located around a terminal axis 44 that extends parallel to the mate direction 42. The terminal axis 44 extends through a terminal opening 46 that extends through the holder body 34.

Figure 6:
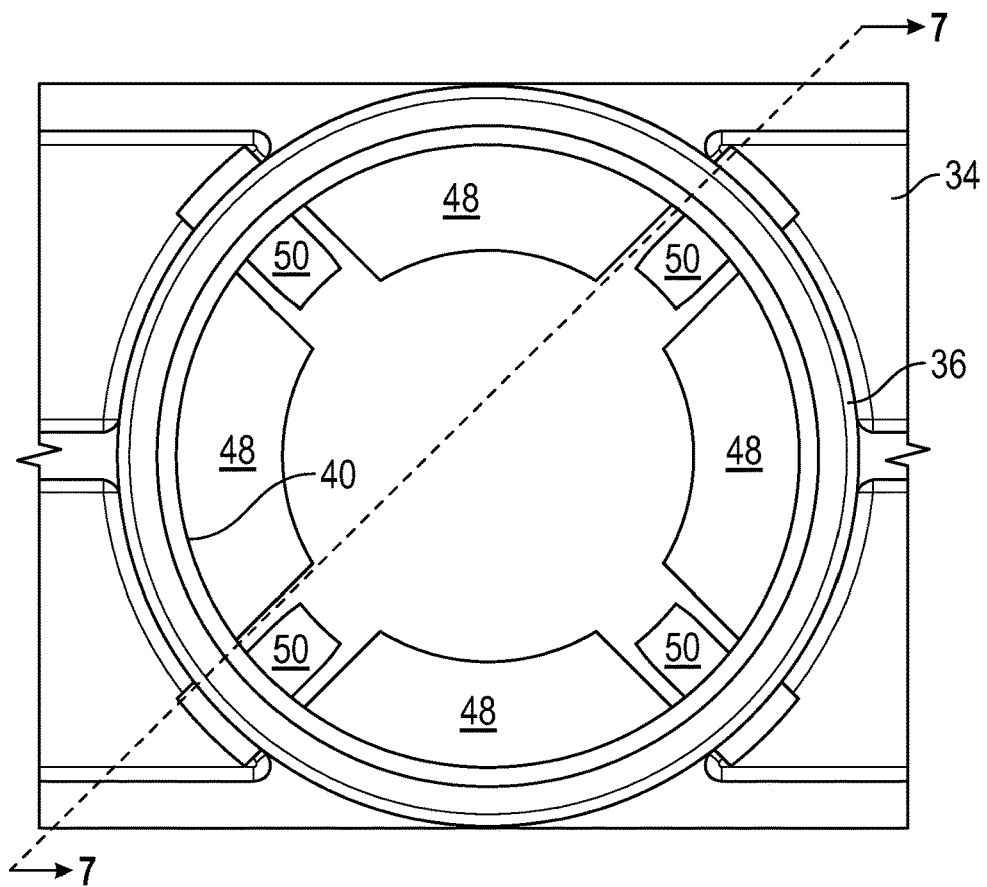
FIG. 6 is an enlarged, plan view of a portion of the terminal holder.
Figure 7:
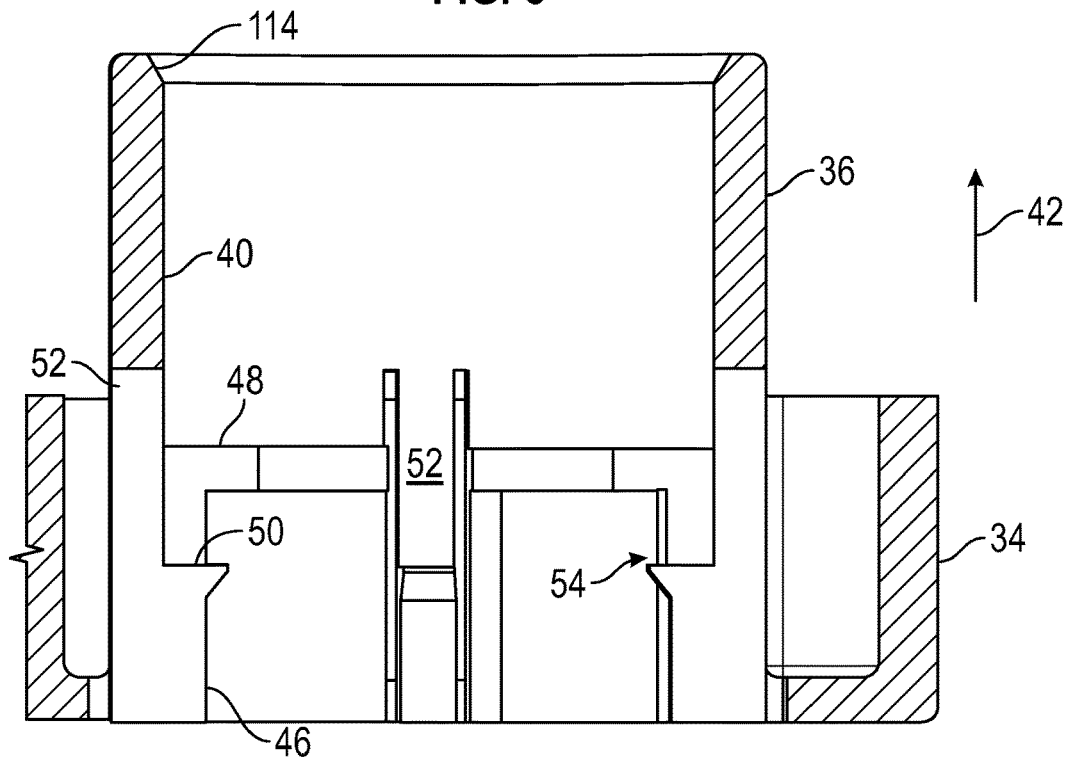
FIG. 7 is a cross-sectional view taken along the line 7-7 of FIG. 6.

FIG. 6 is an enlarged, top view of the terminal mount 36, and FIG. 7 is a cross-sectional view taken along the line 7-7 of FIG. 6. The illustrated terminal shroud 40 has a circular cross-sectional shape around the terminal axis 44, but may have any desired shape. The terminal mount 36 includes a lock flange 48 that extends from the terminal shroud 40 toward the terminal axis 44. In the illustrated embodiment, as best shown in FIG. 6, the lock flange 48 includes four separate parts that are spaced-apart around an interior circumference of the terminal shroud 40. However, the lock flange 48 may have any desired shape and distribution within the terminal shroud 40.

The terminal mount 36 also includes lock fingers 50 that extend from the terminal shroud 40 toward the terminal axis 44. In the illustrated embodiment, the terminal mount 36 includes four lock fingers 50 that spaced-apart around the interior circumference of the terminal shroud 40. However, the terminal mount 36 may have any desired number and distribution of lock fingers 50. Each of the lock fingers 50 extends from a respective resilient lock arm 52 that extends from the terminal shroud 40. A terminal lock space, indicated at 54, is defined between the lock flange 48 and the lock fingers 50.

Figure 8:
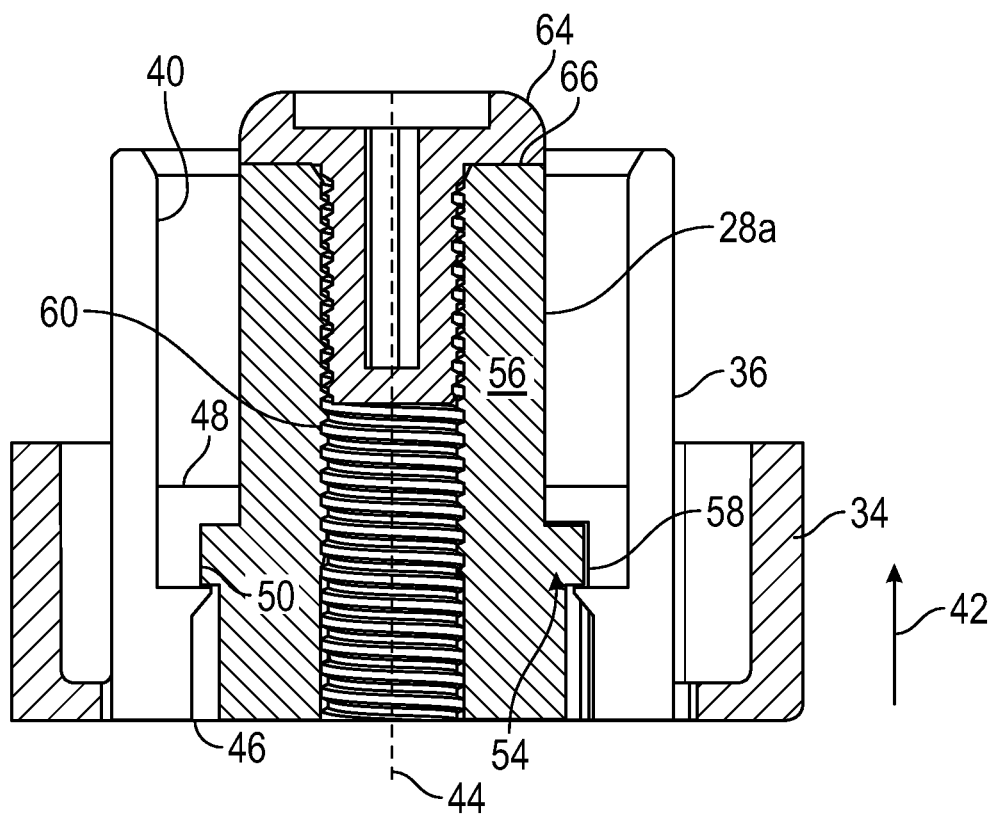
FIG. 8 is a view similar to FIG. 7, with a terminal installed in the terminal holder and prior to attachment to a bus bar.
Figure 8:
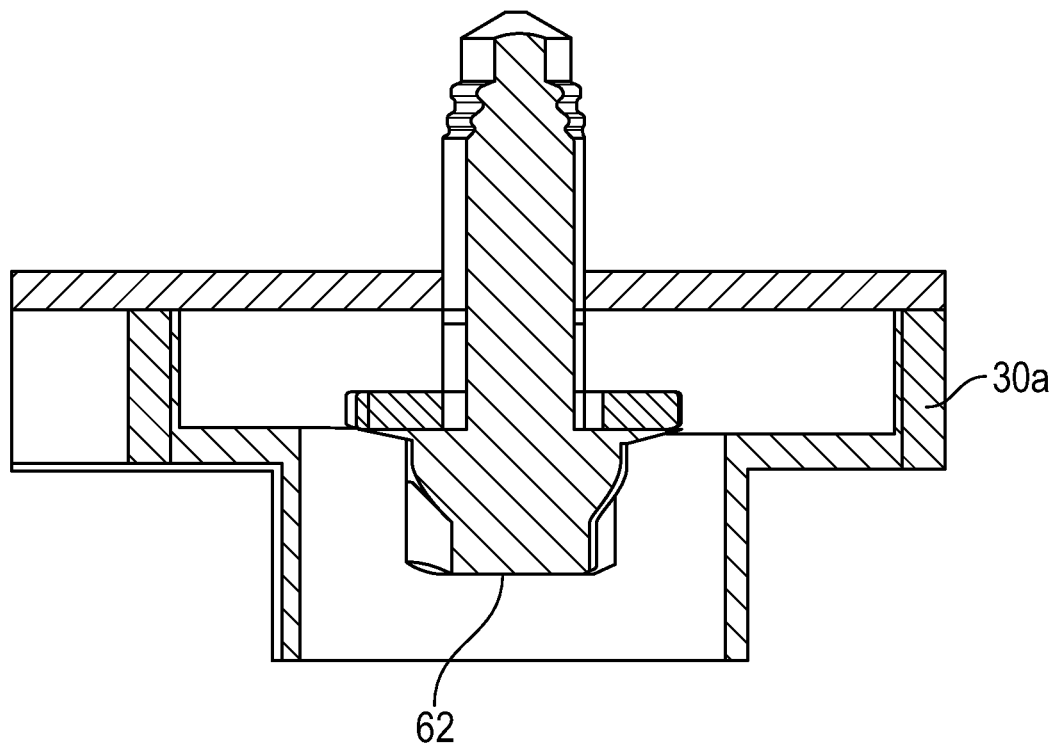

Referring now to FIG. 8, a view similar to FIG. 7 is illustrated, with the header terminal 28a shown inserted into the terminal mount 36. Additionally, the header bus bar 30a is shown in FIG. 8, prior to being connected to the header terminal 28a. The header terminal 28a includes a terminal body 56. In the illustrated embodiment, the terminal body 56 has a cylindrical cross-sectional shape around the terminal axis 44, but may have any desired shape. The header terminal 28a includes a terminal flange 58 that extends from the terminal body 56 away from the terminal axis 44. In order to install the header terminal 28a into the terminal mount 36, the header terminal 28a is inserted through the terminal opening 46 and moved in the mate direction 42.

The terminal flange 58 engages the lock fingers 50 and pushes the lock fingers 50 away from the terminal axis 44. When the header terminal 28a has been inserted into the terminal mount 36 so that the terminal flange 58 is located in the terminal lock space 54, the terminal lock fingers 50 rebounds toward the terminal axis 44. The terminal flange is then retained in the terminal lock space 54 between the lock flange 48 and the lock fingers 50 and the header terminal 28a is retained in the terminal mount 36.

The header terminal 28a includes a mount hole 60. The mount hole 60 passes through the terminal body 56 and the terminal axis 44 passes through the mount hole 60. The mount hole 60 includes threads to retain a threaded connector 62. As illustrated in FIG. 8, the threaded connector 62 is located through a portion of the header bus bar 30a and is not inserted into the mount hole 60.

A touch protection 64 is located on a mate end 66 of the header terminal 28a. The touch protection 64 extends into the mount hole 60 and engages the threads to retain the touch protection 64 in the illustrated position. The touch protection 64 is made of a non-conductive material and helps prevent unintended electrical contact with the terminal body 56. As illustrated, the terminal body 56 is located within the terminal shroud 40 and the terminal shroud 40 and the touch protection 64 limit the space available to engage in electrical contact with the terminal body 56.

Figure 9:
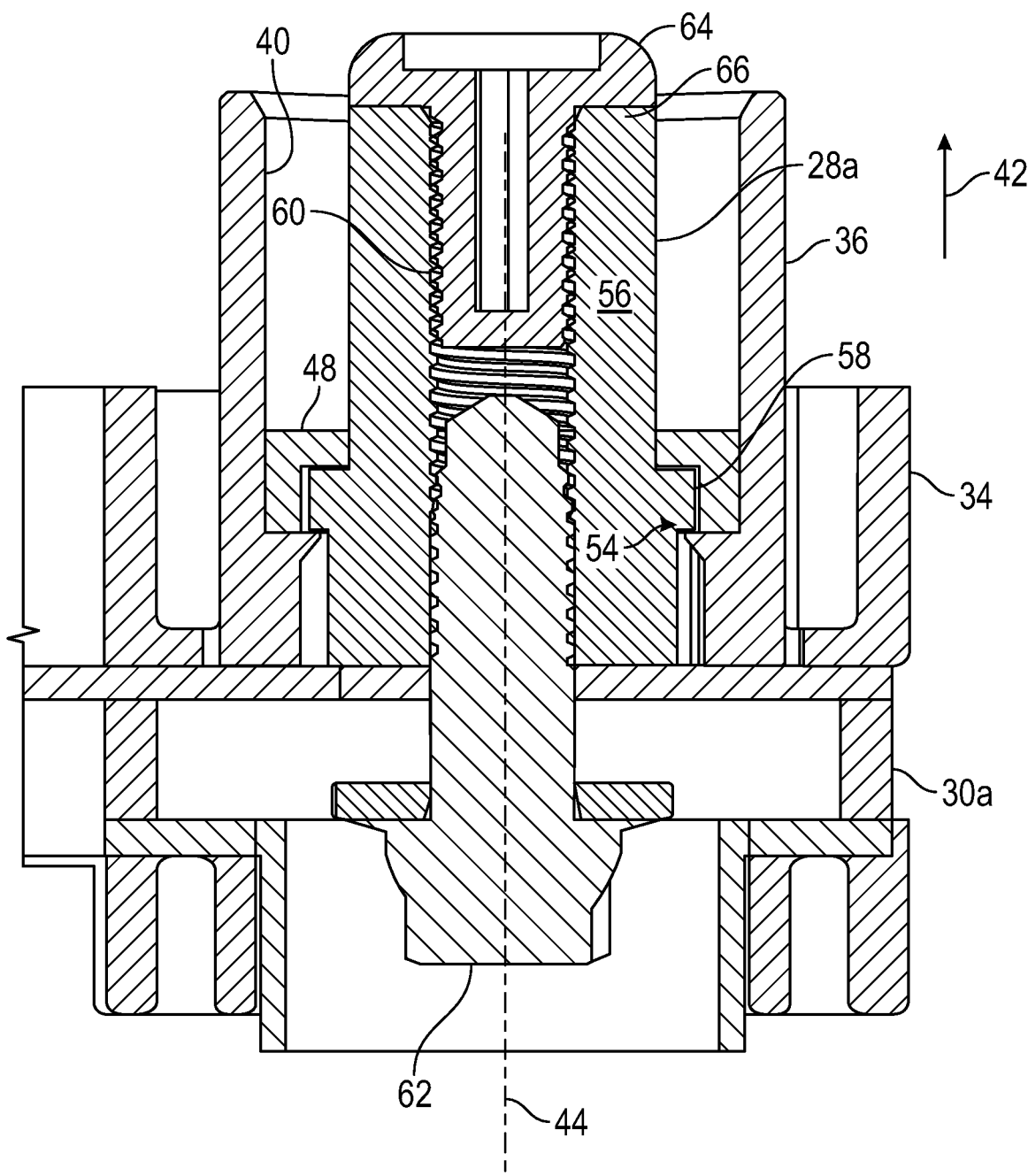
FIG. 9 is a view similar to FIG. 8, with the terminal shown attached to the bus bar.

FIG. 9 is a view similar to FIG. 8, with the threaded connector 62 inserted into the mount hole 60. The threaded connector 62 engages the threads in the mount hole 60 to retain the terminal body 56 in contact with the header bus bar 30a. The illustrated embodiment uses the threaded mounting hole 60 to retain the terminal body 56 in the illustrated position relative to header bus bar 30a and the touch protection 64; however, any desired attachment mechanism may be used.

Figure 10:
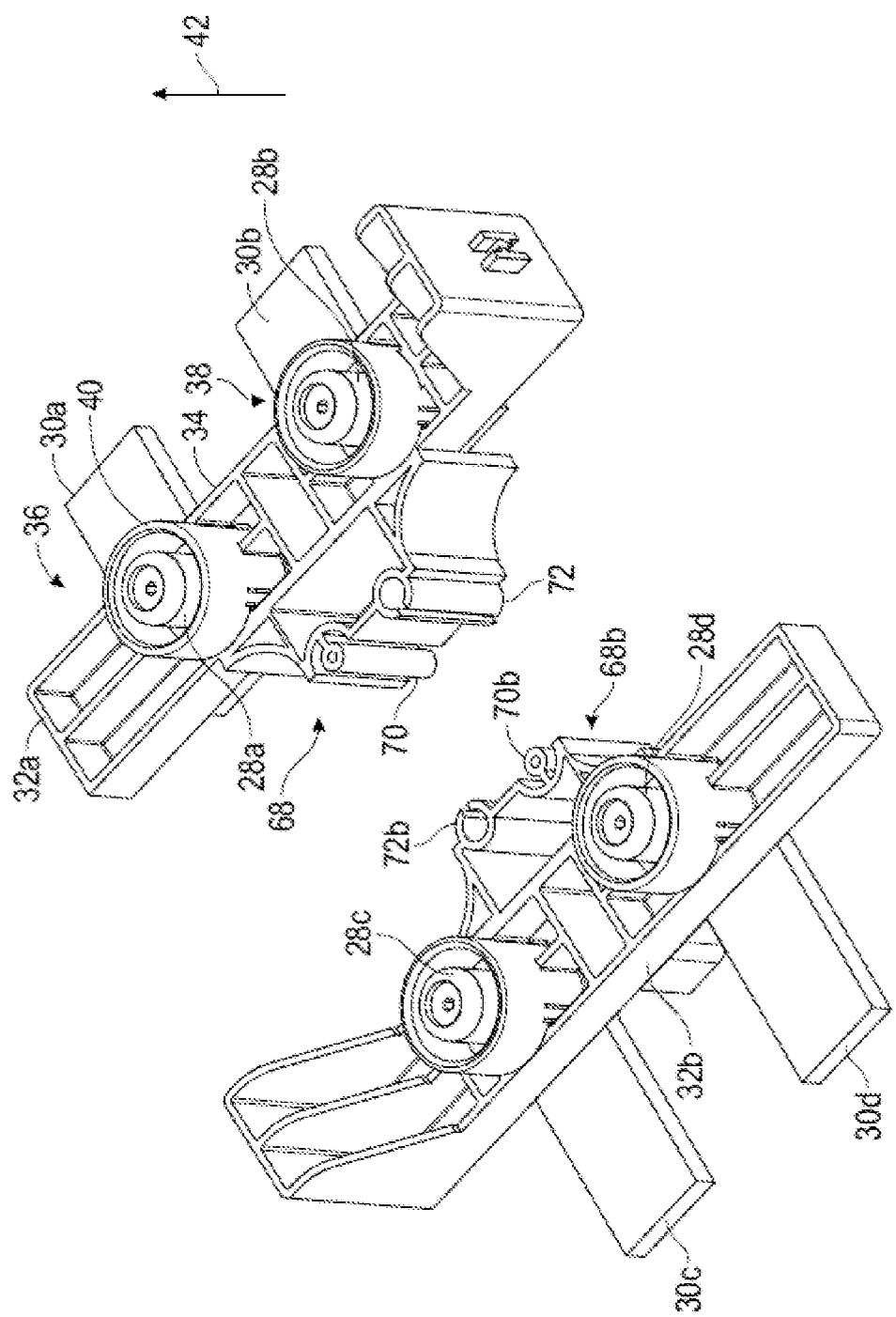
FIG. 10 is a partially-exploded, perspective view of the header assembly, with four bus bars shown attached to respective terminals.

Referring now to FIG. 10, there is illustrated a view of the partially assembled header assembly 26. As illustrated in FIG. 10, the header terminal 28a is retained in the terminal mount 36 on the terminal holder 32a and is connected to the header bus bar 30a, as previously described. Additionally, the header terminal 28b is retained in the terminal mount 38 on the terminal holder 32a and is connected to the header bus bar 30b. Similarly, the header terminals 28c and 28d are retained on the terminal holder 32b and are connected to the respective header bus bars 30c and 30d.

The terminal holder 32a includes an alignment lock, indicated generally at 68. As previously described, the terminal holder 32b is the same as the terminal holder 32a and thus includes a similar alignment lock 68b. The alignment locks 68 and 68b allow the terminal holders 32a and 32b to be assembled into a desired position relative to each other. In the illustrated embodiment, the alignment lock 68 includes a post 70 and a collar 72 that are attached to the holder body 34. Both the post 70 and the collar 72 extend parallel to the terminal axis 44. The terminal holders 32a and 32b are connected to each other by inserting the post 70 into a collar 72b on the terminal holder 32b, and inserting a post 70b on the terminal holder 32b into the collar 72. This allows the terminal holder 32a to be connected to the bus bars 30a and 30b as part of a first sub-assembly (not shown) while the terminal holder 32b is connected to the bus bars 30c and 30d as part of a second sub-assembly (not shown). The two sub-assemblies can then be assembled together into the header assembly 26 shown in FIG. 4, and the terminal holders 32a and 32b allow the header terminals 28a, 28b, 28c, and 28d to be placed in the desired relative positions.

Figure 11:
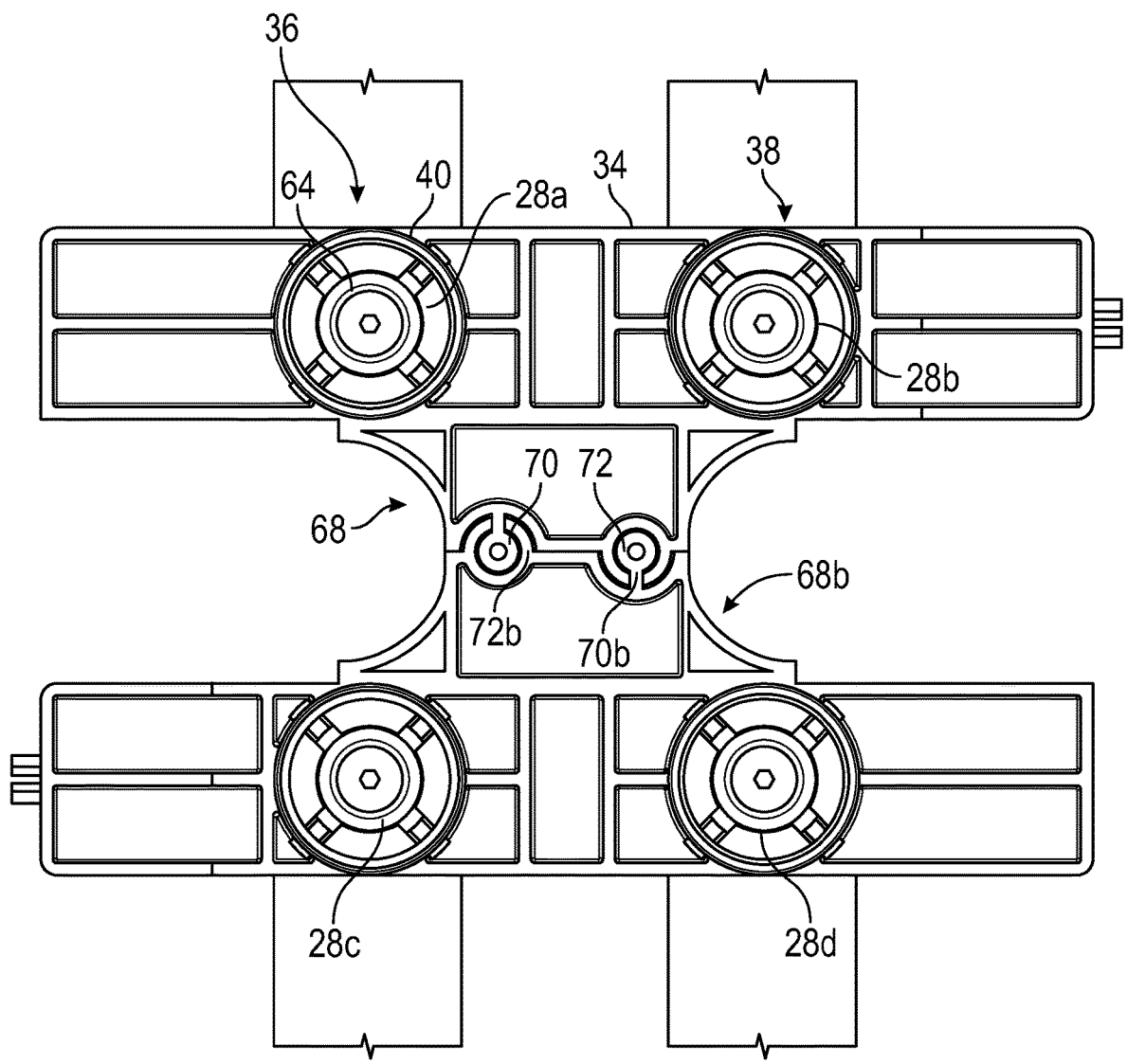
FIG. 11 is a plan view of the header from FIG. 4.

Referring to FIG. 11, a top view of the header assembly 26 is illustrated. As shown, the header terminals 28a, 28b, 28c, and 28d are arranged generally at the corners of a rectangular-shaped space. However, the header terminals 28a, 28b, 28c, and 28d may have any desired relative positions.

Figure 12:
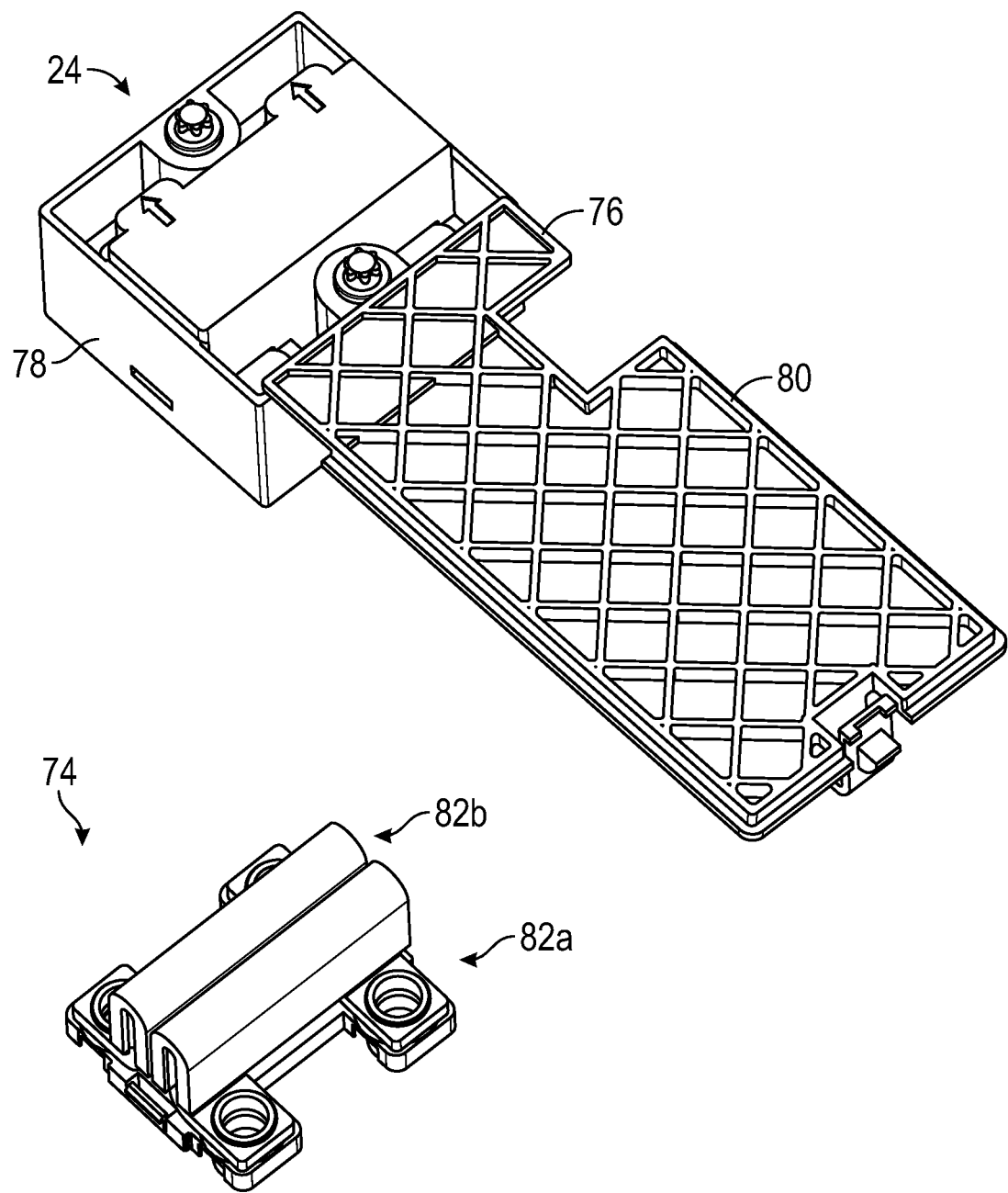
FIG. 12 is a partially exploded, perspective view of the plug assembly from FIG. 3, with a terminal assembly shown separate from a plug body.

Referring now to FIG. 12, there is illustrated a partially exploded view of the plug assembly 24 from FIG. 3. The plug assembly 24 is illustrated with a terminal assembly, indicated generally at 74, shown separate from a plug body 76. The illustrated plug body 76 is molded from non-conductive plastic, but may be made of any desired material and may be made by any desired process. The plug assembly 24 includes a terminal housing 78 that is part of the plug body 76. When the plug assembly 24 is assembled, the terminal assembly 74 is retained in the terminal housing 78, as described below. The plug assembly 24 also includes a plug handle 80 that is part of the plug body 76. The plug handle 80 assists the technician in manipulating and placing the plug assembly 24.

Figure 13:
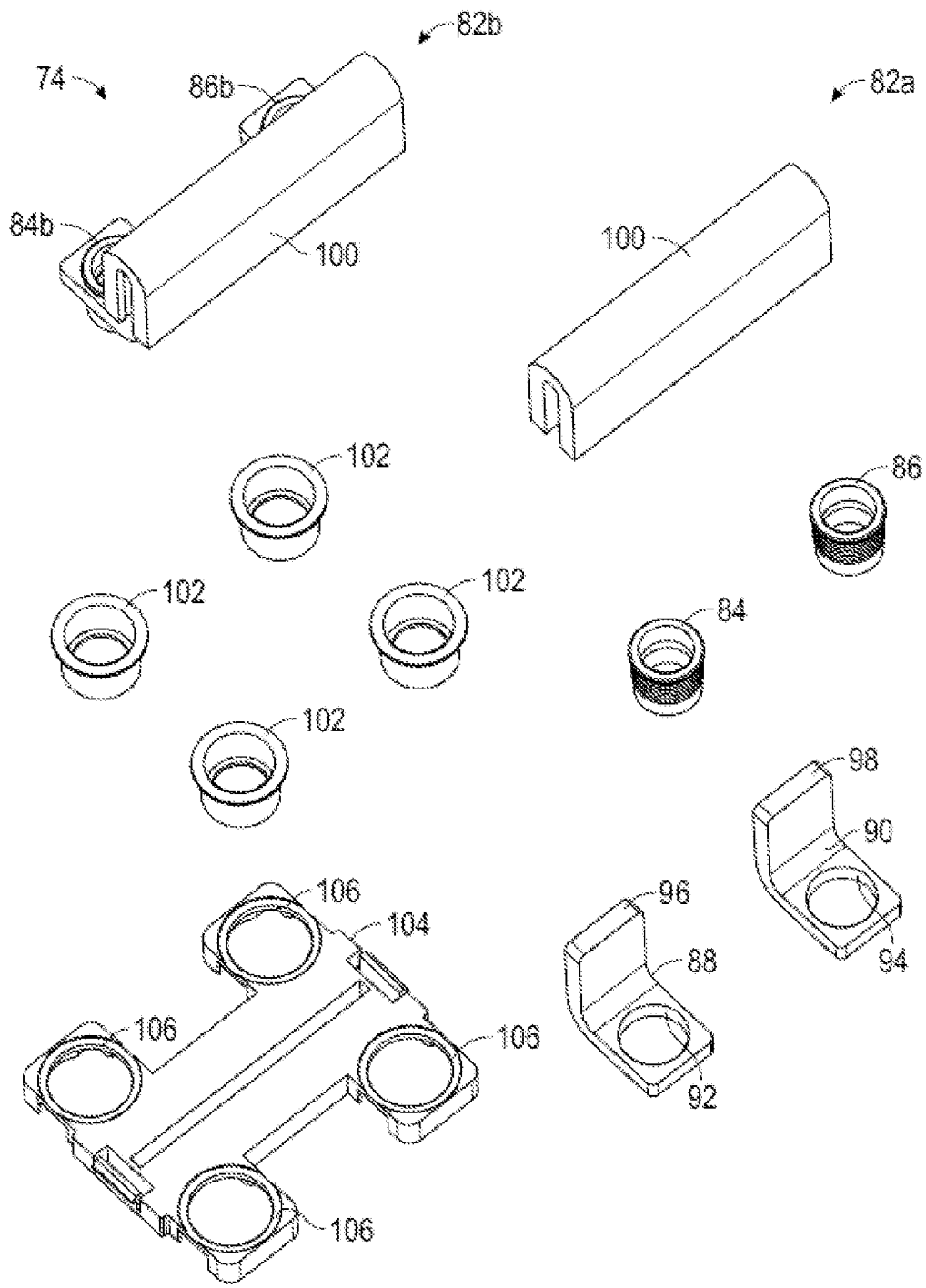
FIG. 13 is an enlarged, exploded view of the terminal assembly from FIG. 12.

Referring to FIG. 13, there is illustrated an enlarged, partially exploded view of the terminal assembly 74. The terminal assembly 74 includes two bus bar assemblies, indicated at 82a and 82b respectively. The bus bar assemblies 82a and 82b include similar components and only one will be described in detail. In FIG. 13, the bus bar assembly 82a is shown exploded while the bus bar assembly 82b is shown assembled.

The bus bar assembly 82a includes two plug terminals 84 and 86. The illustrated plug terminals 84 and 86 each have a cylindrical shape and are adapted to mate with the previously described header terminal 28a. However, the plug terminals 84 and 86 may have any desired shape. The bus bar assembly 82a includes two terminal leads 88 and 90. The terminal leads 88 and 90 are made of an L-shaped piece of sheet metal, but may be made of any desired material in any desired shape. The terminal leads 88 and 90 include respective terminal mounts 92 and 94. The terminal mount 92 allows the plug terminal 84 to be attached to the terminal lead 88. The illustrated terminal mount 92 is a hole through the terminal lead 88 that the plug terminal 84 is inserted into, but any desired attachment method may be used. Similarly, the terminal mount 94 allows the plug terminal 86 to be attached to the terminal lead 88. The terminal leads 88 and 90 also include respective tail ends 96 and 98.

The bus bar assembly 82a includes a flexible bus bar 100. The illustrated flexible bus bar 100 is made of an electrically conductive, braided metal. However, the flexible bus bar 100 may be made of any desired material. The flexible bus bar 100 is folded into a U-shape so that is engages two sides of the tail ends 96 and 98. The illustrated flexible bus bar 100 is attached to both of the terminal leads 88 and 90 by welding, but may be attached using any desired method. The flexible bus bar 100 provides an electrical connection between the plug terminals 84 and 86, while allowing relative movement between the plug terminals 84 and 86.

The bus bar assembly 82a includes two terminal guides 102. Each of the terminal guides 102 is sized and shaped to fit on a respective one of the plug terminals 84 and 86. The illustrated terminal guides 102 are made of non-conductive plastic, but may be made of any desired material.

The terminal assembly 74 includes a terminal retainer 104. The terminal retainer is adapted to retain the bus bar assemblies 82a and 82b in the terminal housing 78 of the plug assembly 24. The illustrated terminal retainer 104 is made of non-conductive plastic, but may be made of any desired material. The terminal retainer 104 includes four guide openings 106 that are each sized and shaped to accommodate one of the terminal guides 102 being inserted through and retained therein.

Figure 14:
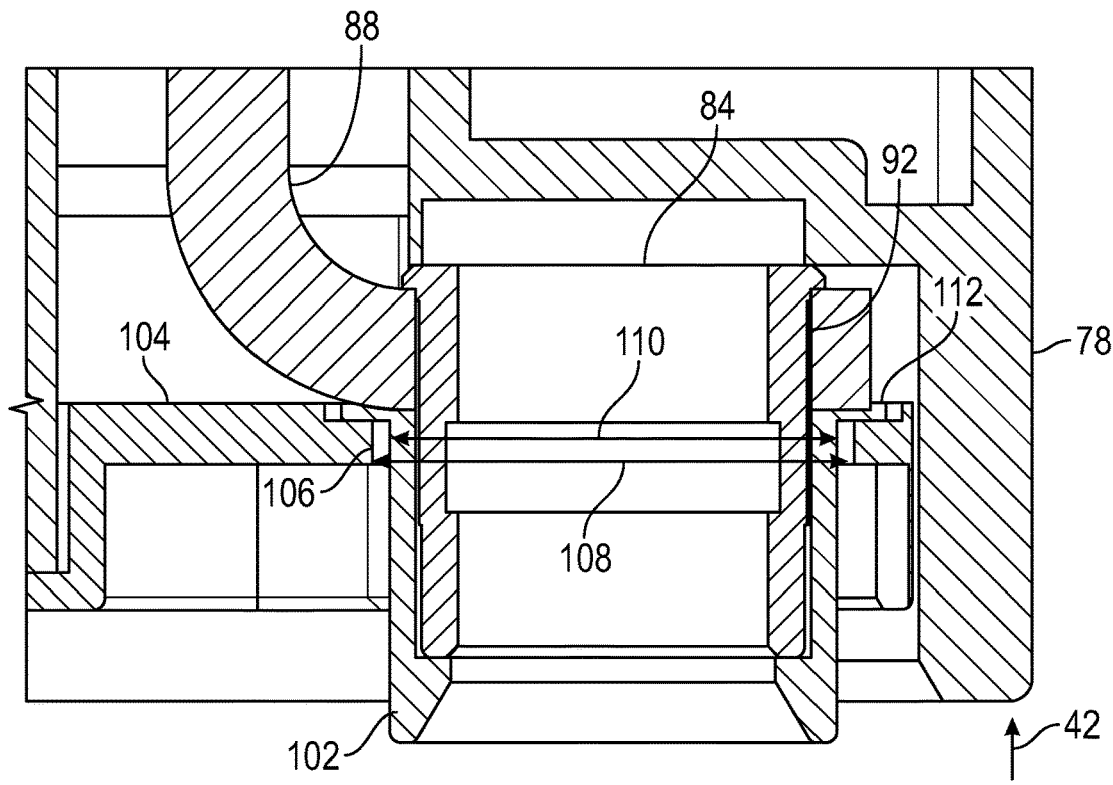
FIG. 14 is a cross-sectional view of a portion of the plug assembly.

Referring now to FIG. 14, there is illustrated a cross-sectional view of a portion of the assembled plug assembly 24. The cross-section is taken through a centerline of the plug terminal 84. As shown, the plug terminal 84 is attached to the terminal lead 88, the terminal guide 102 is attached to the plug terminal 84, and the terminal guide 102 is located in one of the guide openings 106 on the terminal retainer 104. The terminal retainer 104 is snap-fit into the terminal housing 78 and retains the terminal assembly 74 in place relative to the plug body 76.

As shown, the guide opening 106 has an inner diameter 108 that is larger than an outer diameter 110 of the terminal guide 102. This allows the terminal guide 102 to be moved relative to the terminal retainer 104 and relative to the plug body 76. The terminal guide 102 includes a retaining flange 112 that is larger than the guide opening 106, in order to prevent the terminal guide 102 from passing through the guide opening 106. The terminal guide 102 and the guide opening 106 are described by their relative diameters in the illustrated embodiment; however, the terminal guide 102 and the guide opening 106 may have any desired shapes.

Figure 15:
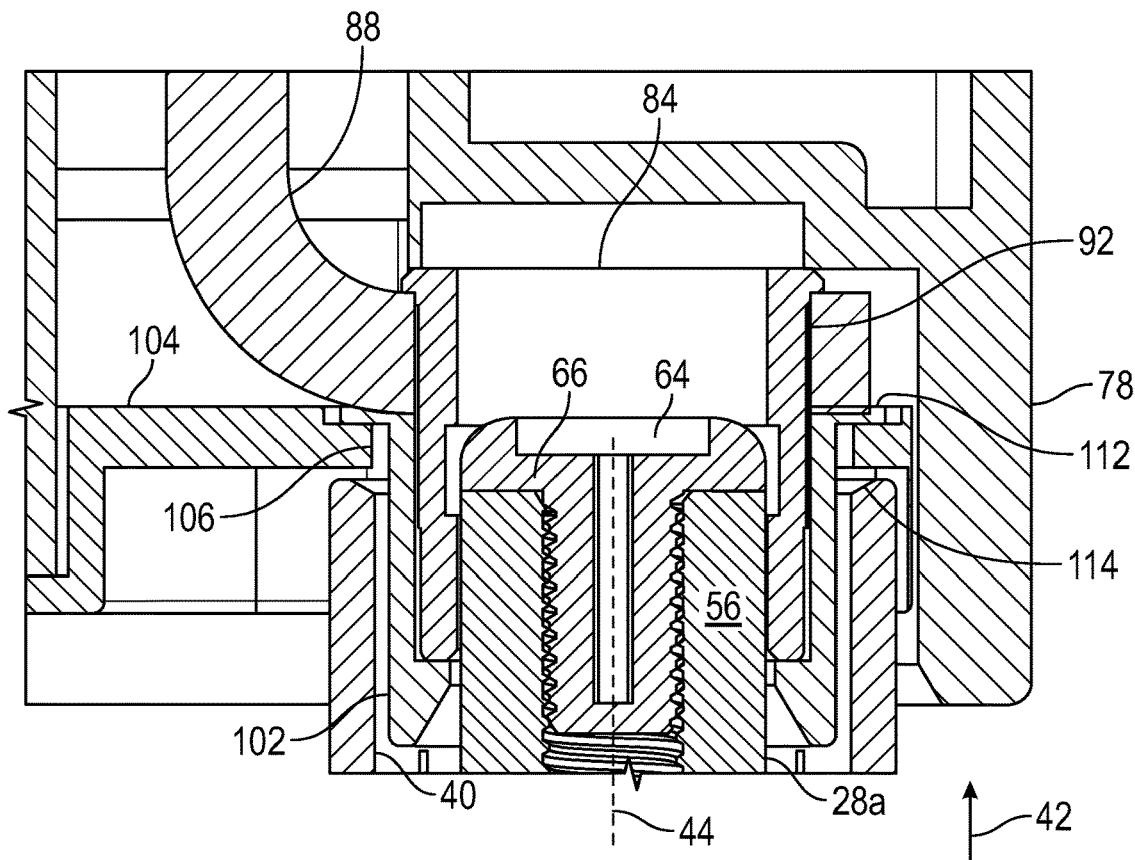
FIG. 15 is a cross-sectional view similar to FIG. 14, with the plug assembly shown in the mated position from FIG. 3.

Referring now to FIG. 15 there is illustrated a view similar to FIG. 14, with the plug assembly 24 shown in the mated position relative to the header assembly 26. As shown, portions of the terminal guide 102 and the plug terminal 84 are located inside the terminal shroud 40, and the plug terminal 84 engages the header terminal 28a. As shown, the terminal shroud 40 includes an angled leading edge 114 that funnels into the terminal shroud 40. The leading edge 114 helps to ensure that the terminal guide 102 properly moves into the terminal shroud 40. The terminal guide 102 and the plug terminal 84 are able to be moved relative to the plug body 76 in a plane that is perpendicular to the terminal axis 44. This allows the plug terminal 84 to be moved into proper engagement with the header terminal 28a when the plug assembly 24 is mated with the header assembly 26.

Figure 16:
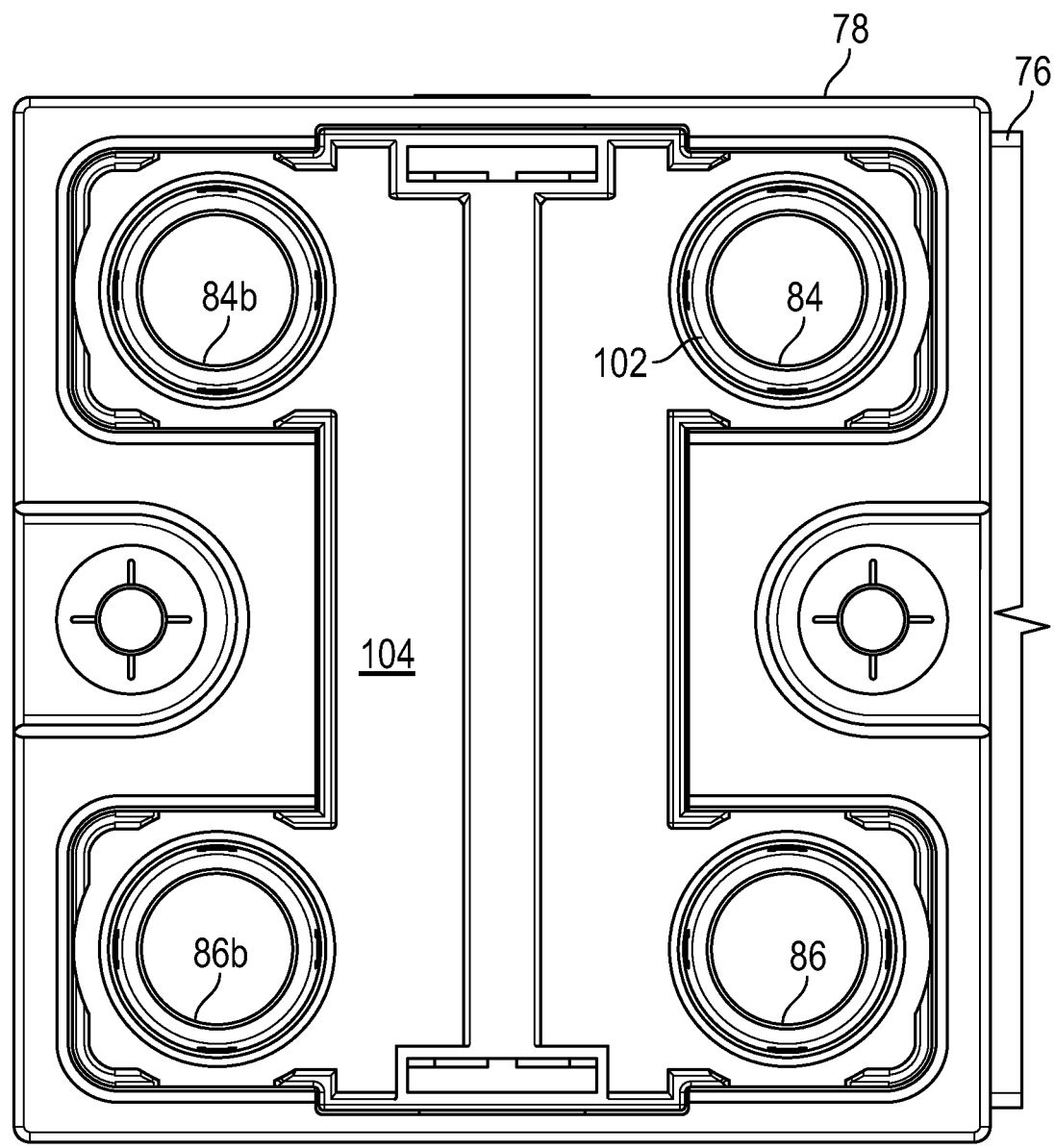
FIG. 16 is an enlarged plan view of the plug assembly, showing the terminal assembly installed in the plug body.

Referring to FIG. 16, there is illustrated a detail view of a portion of the plug assembly 24, showing an end view of the terminal assembly 74. As shown, the plug terminals 84, 86, 84b, and 86b are arranged generally at the corners of a rectangular-shaped space. This allows each of the plug terminals 84, 86, 84b, and 86b to engage the respective header terminal 28a, 28b, 28c, and 28d when the plug assembly 24 is mated with the header assembly 26. Each of the plug terminals 84, 86, 84b, and 86b is able to be moved relative to the plug body 76 in the plane that is perpendicular to the terminal axis 44. Additionally, the flexible bus bar 100 and allow the connected plug terminals 84 and 86 to move relative to each other. Thus, each of the plug terminals 84, 86, 84b, and 86b is able to independently move relative to the plug body 76 in order to ensure that each of the plug terminals 84, 86, 84b, and 86b properly engages the respective header terminal 28a, 28b, 28c, and 28d when the plug assembly 24 is mated with the header assembly 26.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A terminal holder comprising:
   a holder body including two terminal mounts that extend therethrough, each terminal mount including a terminal shroud that defines a terminal space around a terminal axis,
   a lock flange that extends from the terminal shroud toward the terminal axis, and
   a lock finger that extends from the terminal shroud toward the terminal axis, wherein the lock flange and the lock finger are spaced apart to define a terminal lock space therebetween.

2. The terminal holder of claim 1, further including an alignment lock attached to the holder body, the alignment lock adapted to engage a like alignment lock on a second holder body to retain the terminal holder in position relative to the second holder body.

3. The terminal holder of claim 2, wherein the alignment lock includes a pin that extends parallel to the terminal axis and a sleeve that extends parallel to the terminal axis.

4. The terminal holder of claim 1, wherein the lock finger is attached to a resilient lock arm that extends from the terminal shroud.

5. The terminal holder of claim 1, further including a first terminal and a second terminal retained in the respective terminal mounts, wherein each of the first terminal and the second terminal include a respective terminal flange that is located in the respective terminal lock space.

6. The terminal holder of claim 5, further including a second terminal holder with a second holder body including two terminal mounts that extend therethrough, each terminal mount including a terminal shroud that defines a terminal space around a terminal axis, including a third terminal and a fourth terminal retained in the respective terminal mounts;
wherein an alignment lock attached to the holder body is engaged with an alignment lock attached to the second holder body to retain the terminal holder in position relative to the second holder body.

7. The terminal holder of claim 6, wherein the alignment lock includes a pin that extends parallel to the terminal axis and a sleeve that extends parallel to the terminal axis.

8. A header assembly comprising:
a first terminal holder that includes a first alignment lock;
a first terminal that is retained in the first terminal holder and is attached to a first bus bar;
a second terminal that is retained in the first terminal holder and is attached to a second bus bar;
a second terminal holder that includes a second alignment lock;
a third terminal that is retained in the second terminal holder and is attached to a third bus bar; and
a fourth terminal that is retained in the second terminal holder and is attached to a fourth bus bar;
wherein the first alignment lock is engaged with the second alignment lock to place the first terminal holder in a desired position relative to the second terminal holder.

9. The header assembly of claim 8, wherein the first alignment lock includes a pin and a sleeve that extends parallel to the pin and the second alignment lock includes a second pin and a second sleeve that extends parallel to the second pin, wherein the second pin is located in the sleeve and pin is located in the second sleeve.

10. The header assembly of claim 8, wherein the first terminal holder includes a first terminal shroud that is located around the first terminal and a second terminal shroud that is located around the second terminal.

11. The header assembly of claim 10, wherein the first terminal is attached to the first bus bar by a connector that extends into a first mount hole in the first terminal.

12. The header assembly of claim 11, further including a first touch protection that is attached to the first terminal and extends into the first mount hole.

* * * * *